United States Patent
Sharma et al.

(10) Patent No.: US 12,503,358 B2
(45) Date of Patent: Dec. 23, 2025

(54) ANCHOR DESIGN WITH REJECTION OF EXTERNAL SHEAR FORCE

(71) Applicant: InvenSense, Inc., San Jose, CA (US)

(72) Inventors: Mrigank Sharma, Milpitas, CA (US); Varun Subramaniam Kumar, San Jose, CA (US); Luca Coronato, Corsico (IT); Giacomo Laghi, Los Gatos, CA (US); Matthew Julian Thompson, Beaverton, OR (US)

(73) Assignee: InvenSense, Inc., San Jose, CA (US)

( * ) Notice: Subject to any disclaimer, the term of this patent is extended or adjusted under 35 U.S.C. 154(b) by 567 days.

(21) Appl. No.: 17/740,832

(22) Filed: May 10, 2022

(65) Prior Publication Data

US 2023/0365397 A1     Nov. 16, 2023

(51) Int. Cl.
    *B81B 3/00*     (2006.01)
(52) U.S. Cl.
    CPC .... *B81B 3/0054* (2013.01); *B81B 2201/0235* (2013.01); *B81B 2203/0307* (2013.01)
(58) Field of Classification Search
    CPC ............... B81B 3/0054; B81B 7/0048; B81B 2201/0235; B81B 2201/0242; B81B 2203/0307
    See application file for complete search history.

(56) References Cited

U.S. PATENT DOCUMENTS

| | | | |
|---|---|---|---|
| 8,852,984 B1* | 10/2014 | Quevy | B81B 3/0062 |
| | | | 438/48 |
| 2016/0025492 A1* | 1/2016 | Rocchi | G01C 19/5712 |
| | | | 73/504.08 |
| 2016/0152202 A1* | 6/2016 | Rytkönen | B60R 21/01 |
| | | | 73/514.38 |
| 2018/0031602 A1* | 2/2018 | Huang | G01P 15/13 |
| 2018/0238689 A1* | 8/2018 | Ruohio | G01P 15/125 |
| 2020/0096538 A1* | 3/2020 | Zhang | G01P 15/125 |
| 2020/0141732 A1* | 5/2020 | Acar | G01P 15/0802 |
| 2020/0233011 A1* | 7/2020 | Laghi | B81B 3/0086 |
| 2020/0363446 A1* | 11/2020 | Vesterinen | B81B 3/0021 |
| 2022/0217473 A1 | 7/2022 | Lee et al. | |

FOREIGN PATENT DOCUMENTS

| | | |
|---|---|---|
| CN | 112578146 B | 7/2022 |
| CN | 217088148 U | 7/2022 |
| CN | 110921611 B | 8/2022 |
| CN | 114858152 A | 8/2022 |
| CN | 114879104 A | 8/2022 |
| CN | 217155417 U | 8/2022 |

* cited by examiner

*Primary Examiner* — Fernando L Toledo
*Assistant Examiner* — Marshall Mu-Nuo Hatfield
(74) *Attorney, Agent, or Firm* — Van Hoven PC; Joshua Van Hoven (57) ABSTRACT

A MEMS sensor includes at least one anchor that extends into a MEMS layer and a proof mass suspended from the at least one anchor. Each anchor is coupled to the proof mass via two compliant springs that are oriented perpendicular to each other and attached to a respective anchor. The compliant springs absorb non-measured external forces such as shear forces that are applied to the sensor packaging, preventing these forces from modifying the relative location and operation of the proof mass.

20 Claims, 5 Drawing Sheets

ANCHOR DESIGN WITH REJECTION OF EXTERNAL SHEAR FORCE

BACKGROUND

Numerous items such as smart phones, smart watches, tablets, automobiles, aerial drones, appliances, aircraft, exercise aids, and game controllers may utilize sensors such as microelectromechanical system (MEMS) sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognizing skid or roll-over conditions).

MEMS sensors may be fabricated using semiconductor manufacturing techniques. A MEMS sensor may include movable proof masses that can respond to forces such as linear acceleration (e.g., for MEMS accelerometers), angular velocity (e.g., for MEMS gyroscopes), pressure, and magnetic field. The operation of these forces on the movable proof masses may be measured based on the movement of the proof masses in response to the forces. In some implementations, this movement is measured based on distance between the movable proof masses and fixed electrodes, which form capacitors for sensing the movement.

The MEMS sensor may include multiple layers that are manufactured to collectively form the sensor cavity and components, such as a MEMS layer, cap layer, and base substrate layer. These layers typically have parallel surfaces with respect to each other. The movable proof masses may be located in the MEMS layer. When fixed electrodes are also located within the MEMS layer, movement of the movable poof masses within the MEMS layer (in-plane movement) relative to the fixed electrodes may be used to measure a force along a plane of the MEMS layer. When fixed electrodes are located on another layer, movement of the movable poof masses outside the plane of the MEMS layer (out-of-plane movement) relative to the fixed electrodes may be used to measure a force out of the plane of the MEMS layer (e.g., perpendicular to the MEMS layer). The MEMS sensors may be designed based on expected relative locations of the movable proof masses and the fixed electrodes, both in the absence of external forces and in response to external forces. If a particular MEMS sensor departs from those expected relative locations due to factors such as manufacturing tolerances, wear, or external stresses applied to the sensor, the measurement of the desired force by the sensor may be inaccurate.

SUMMARY

In an embodiment of the present disclosure, a MEMS sensor comprises at least one anchor that extends into a MEMS layer and a suspended spring-mass system located in the MEMS layer that extends along a first direction and a second direction and comprises a proof mass that proof mass that is configured to move in a third direction in response to an external excitation, wherein the first direction, second direction, and third direction are orthogonal to each other. The MEMS sensor further comprises a first compliant spring connected between the at least one anchor and the suspended spring-mass system, wherein the first compliant spring rotates about a first axis that extends in the first direction in response to a shear force along the second direction. The MEMS sensor may further comprise a second compliant spring connected between the at least one anchor and the suspended spring-mass system, wherein the second compliant spring rotates about a second axis that extends the second direction in response to a shear force along the first direction.

In an embodiment of the present disclosure, a MEMS sensor comprises at least one anchor that extends into a MEMS layer, wherein the at least one anchor comprises a first anchor, a second anchor, a third anchor, and a fourth anchor. The MEMS sensor further comprises a suspended spring-mass system located in the MEMS layer that extends along a first direction and a second direction and comprises a proof mass that proof mass that is configured to move in a third direction in response to an external excitation, wherein the first direction, second direction, and third direction are orthogonal to each other. The MEMS sensor further comprises a first compliant spring connected between the first anchor and the suspended spring-mass system, wherein the first compliant spring rotates about a first axis that extends the first direction in response to a shear force along the second direction, and a second compliant spring connected between the first anchor and the suspended spring-mass system, wherein the second compliant spring rotates about a second axis that extends the second direction in response to a shear force along the first direction. The MEMS sensor further comprises a third compliant spring connected between the second anchor and the suspended spring-mass system, wherein the third compliant spring rotates about the a third axis that extends first direction in response to a shear force along the second direction, and a fourth compliant spring connected between the second anchor and the suspended spring-mass system, wherein the fourth compliant spring rotates about a fourth axis that extends the second direction in response to a shear force along the first direction. The MEMS sensor further comprises a fifth compliant spring connected between the third anchor and the suspended spring-mass system, wherein the fifth compliant spring rotates about a fifth axis that extends the first direction in response to a shear force along the second direction and a sixth compliant spring connected between the third anchor and the suspended spring-mass system, wherein the sixth compliant spring rotates about a sixth axis that extends the second direction in response to a shear force along the first direction. The MEMS sensor further comprises a seventh compliant spring connected between the fourth anchor and the suspended spring-mass system, wherein the seventh compliant spring rotates about a seventh axis that extends the first direction in response to a shear force along the second direction and an eighth compliant spring connected between the fourth anchor and the suspended spring-mass system, wherein the eighth compliant spring rotates about an eighth axis that extends the second direction in response to a shear force along the first direction.

In an embodiment of the present disclosure, a MEMS sensor comprises at least one anchor that extends into a MEMS layer and a suspended spring-mass system located in the MEMS layer comprising a proof mass, wherein the proof mass comprises an upper plane and a lower plane parallel to the upper plane, and wherein each of the upper plane and the lower plane extend along a respective first direction and a respective second direction. The MEMS sensor further comprises a first compliant spring connected between the at least one anchor and the proof mass, wherein the first compliant spring rotates about the a first axis that extends first direction in response to a shear force along the second direction and a second compliant spring connected between the at least one anchor and the proof mass, wherein the second compliant spring rotates about a second axis that extends the second direction in response to a shear force along the first direction, and wherein the first compliant spring and the second compliant spring are each located at 20%-80% of the length of a respective anchor side from a first corner of the at least one anchor.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

A MEMS sensor such as a MEMS inertial sensor includes a component such as one or more proof masses that moves in response to a force of interest, such as linear acceleration or a Coriolis force generated by a change in angular velocity. Each proof mass moves relative to a fixed surface which may typically have an electrode formed thereon, forming a variable capacitor that changes in value based on the relative position of the proof mass and the fixed electrodes. In a typical configuration, a proof mass and fixed electrodes may be designed and configured that a portion of the proof mass moves towards some of the fixed electrodes while another portion of the proof mass moves towards other of the fixed electrodes, resulting in differential sensing. The accuracy of the measurement of the parameter of interest (e.g., linear acceleration or angular velocity) depends upon the predictability and repeatability of this capacitance.

The MEMS sensor includes a spring-mass system (e.g., including the proof mass) that is suspended from a plurality of anchors of an anchoring system. The anchoring system and components of the suspended spring-mass system are configured to maintain the proof mass at its relative position with respect to fixed electrodes despite the existence of undesirable external forces, such as shear forces that create a tilt in the anchors. For example, a MEMS sensor has multiple layers which may experience shear forces (e.g., along horizontal planes on the respective layers). Those forces cause relative movement of the layers, which in turn, causes the anchors that extend therebetween to tilt in a direction corresponding to the shear force. Such forces may be imparted on the MEMS sensor in manufacturing, final assembly with other components, in end-use applications, and in a variety of other circumstances.

The configuration of the anchors and the suspended spring-mass system prevents such tilt from being transferred to the proof mass that is suspended from the anchors. Each anchor has one or more compliant springs coupled thereto between the anchor and the proof mass. For example, each anchor may have two compliant springs coupled perpendicular to each other at corresponding positions. Each compliant spring may rotate about a compliant axis that is perpendicular to a shear force and direction of tilt of the anchor. For example, a first compliant spring may respond to an x-axis shear force and electrode tilt by rotating about its y-axis, essentially absorbing the displacement caused by the x-axis tilt within the rotation of the compliant spring. A second compliant spring that rotates about its x-axis may similarly absorb a y-axis shear force and anchor tilt. Configuring an anchor such that it has both first and second compliant springs allows for absorption of forces at any angle within an x-y plane.

Stiffening springs may also be coupled between the compliant springs and the proof mass, which further decouple any force or movement imparted on the coupling springs from translating to the proof mass. The stiffening springs are oriented parallel to the axis of rotation of associated compliant springs, and also provide for protection against shocks applied to the MEMS sensor such as from dropping of products. In an example configuration, four anchors may be symmetrically disposed within a central region of the MEMS sensor, each with two perpendicular compliant springs extending symmetrically therefrom towards a central internal mass that connects the compliant springs to their associated stiffening springs. The entire decoupling structure (e.g., including anchors, compliant springs, internal mass, and stiffening springs) may be symmetric about both the x-axis and y-axis within an x-y plane. The proof mass may in turn be coupled to the stiffening springs surrounding the decoupling region.

Figure 1:
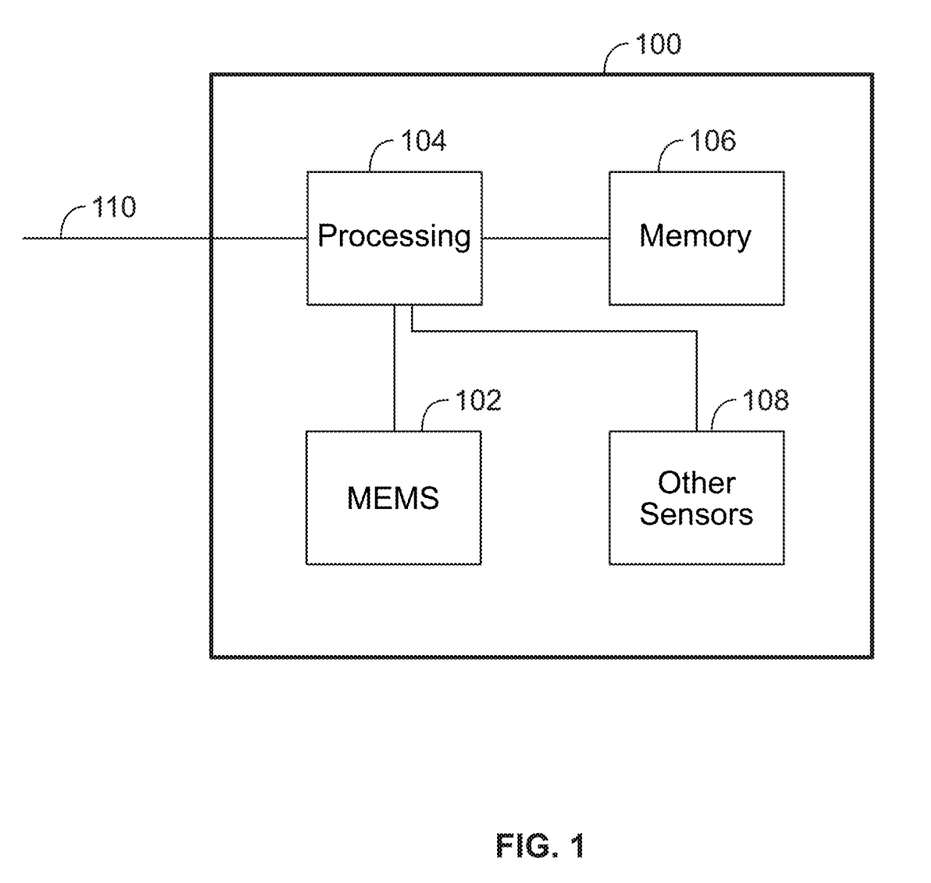
FIG. 1 shows an illustrative MEMS system in accordance with an embodiment of the present disclosure.

FIG. 1 shows an illustrative MEMS system in accordance with an embodiment of the present disclosure. Although particular components are depicted in FIG. 1, it will be understood that other suitable combinations of MEMS, processing components, memory, and other circuitry may be utilized as necessary for different applications and systems. In certain embodiments of the present disclosure, the circuitry, devices, systems, and methods described herein may be described in the context of a system including at least one anchor extending into a MEMS layer that rejects a combination of shear forces due to compliant springs, which absorb packaging deformations, and stiffening springs, which decouple the forces imposed on the respective compliant springs from the proof mass. It will be understood that the circuitry, devices, systems, and methods described herein may be applied to other types of MEMS devices or sensors.

Processing circuitry 104 may include one or more components providing necessary processing based on the requirements of the MEMS system 100. In some embodiments, processing circuitry 104 may include hardware control logic that may be integrated within a chip of a sensor (e.g., on a base substrate of a MEMS sensor 102 or other sensor 108, or on an adjacent portion of a chip to the MEMS sensor 102 or other sensor 108) to control the operation of the MEMS sensor 102 or other sensors 108 and perform aspects of processing for the MEMS sensor 102 or the other sensors 108. In some embodiments, the MEMS sensor 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS sensor 102 by interacting with the hardware control logic and processing signals received from MEMS sensor 102. The microprocessor may interact with other sensors in a similar manner. In some embodiments, some or all of the functions of the processing circuitry 104, and in some embodiments, of memory 106, may be implemented on an application specific integrated circuit ("ASIC") and/or a field programmable gate array ("FPGA").

Although in some embodiments (not depicted in FIG. 1), the MEMS sensor 102 or other sensors 108 may communicate directly with external circuitry (e.g., via a serial bus or direct connection to sensor outputs and control inputs), in an embodiment the processing circuitry 104 may process data received from the MEMS sensor 102 and other sensors 108 and communicate with external components via a communication interface 110 (e.g., a SPI or I2C bus, in automotive applications a controller area network (CAN) or Local Interconnect Network (LIN) bus, or in other applications suitably wired or wireless communications interfaces as is known in the art). The processing circuitry 104 may convert signals received from the MEMS sensor 102 and other sensors 108 into appropriate measurement units (e.g., based on settings provided by other computing units communicating over the communication bus 110) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS sensor 102 or other MEMS sensors 108.

In some embodiments, certain types of information may be determined based on data from multiple MEMS inertial sensors 102 and other sensors 108, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

In accordance with the present disclosure, a configuration of springs coupled between at least one anchor extending into a MEMS layer and a proof mass of a suspended spring-mass system within that MEMS layer rejects shear forces imparted on the MEMS sensor 102 via the anchors, such as by packaging stresses or external stresses applied to the MEMS chip. The configuration rejects the shear forces based on particular configurations of compliant springs, which absorb package deformations, and stiffening springs, which decouple forces imparted on the respective compliant springs from the proof mass. MEMS sensor 102 includes a suspended spring-mass system which in turn includes proof mass, where the proof mass includes an upper plane and lower plane parallel to the upper plane. Each of the upper plane and lower plane extend along a respective first direction (e.g., along an x-axis) and a respective second direction (e.g., y-axis) in parallel planes (e.g., x-y planes). Although the present disclosure may describe embodiments in the context of a particular coordinate system and orientation (e.g., a particular orientation of x-y-z axes), it will be understood that the present disclosure applies similarly to any coordinate system and directions in which respective directions are orthogonal to each other (e.g., a first direction, second direction, and third direction, each orthogonal to each other).

The proof mass of the suspended spring-mass system moves in response to a force of interest (e.g., out-of-plane in a z-axis direction in response to a z-axis linear acceleration or other force of interest along the z-axis, or in-plane along one of the x-axis or y-axis in response to a y-axis linear acceleration or other force of interest along the x-axis or y-axis). Each anchor may be coupled to compliant springs (e.g., two compliant springs) that reject shear forces within the x-y plane. A first compliant spring connects between the at least one anchor and the suspended spring-mass system, where the first compliant spring rotates about the x-axis in response to a shear force along the y-axis, and a second compliant spring connects between the at least one anchor and the suspended spring-mass system, where the second compliant spring rotates about the y-axis in response to a shear force along the x-axis. In some embodiments, there may be any suitable number of compliant springs coupled to the at least one anchor along any suitable axis. Stiffening springs may also be located between the compliant springs and the proof mass of the suspended spring-mass system to provide decoupling of forces imparted on the compliant springs and to provide shock absorption in cases of shock or drops. A first stiffening spring is coupled to the first compliant spring such that the first stiffening spring is orthogonal (e.g., perpendicular) to a direction of a force (e.g., a shear force) that causes first compliant spring to twist (e.g., about an axis parallel to the first direction). It will be understood there may be any suitable number of stiffening springs positioned along any suitable axes. In an embodiment, such a configuration may be repeated for four anchors, with each anchor having associated compliant springs and stiffening springs, each of which provide a connection to a common proof mass of the suspended spring-mass system. Although other numbers of anchors and anchor/spring configurations may be utilized in other embodiments, in some embodiments the anchors and springs may be located in a center region of the MEMS sensor and may be symmetric about both an x-axis symmetry line and a y-axis symmetry line. The proof mass of the suspended spring-mass system may surround this central anchoring region, being connected to the respective anchors via the stiffening and compliant springs, as described herein.

The aforementioned orientation of anchors, compliant springs, stiffening springs, and a proof mass rejects external package deformation within the x-y plane, thus preventing changes in offset between the proof mass and sense electrodes. A shear force applied to the MEMS sensor may cause the anchors to shift or tilt. In the absence of features such as those of the present disclosure, this change in position of the anchors may also be translated to any proof masses coupled to the anchors, for example, causing the proof mass to tilt out of the x-y plane or otherwise change position relative to other components of the MEMS sensor, such as electrodes (e.g., located in plane with the proof mass or on a normally parallel surface such as a substrate of the MEMS sensor) that form capacitors with the proof mass for sensing a force of interest.

Figure 2:
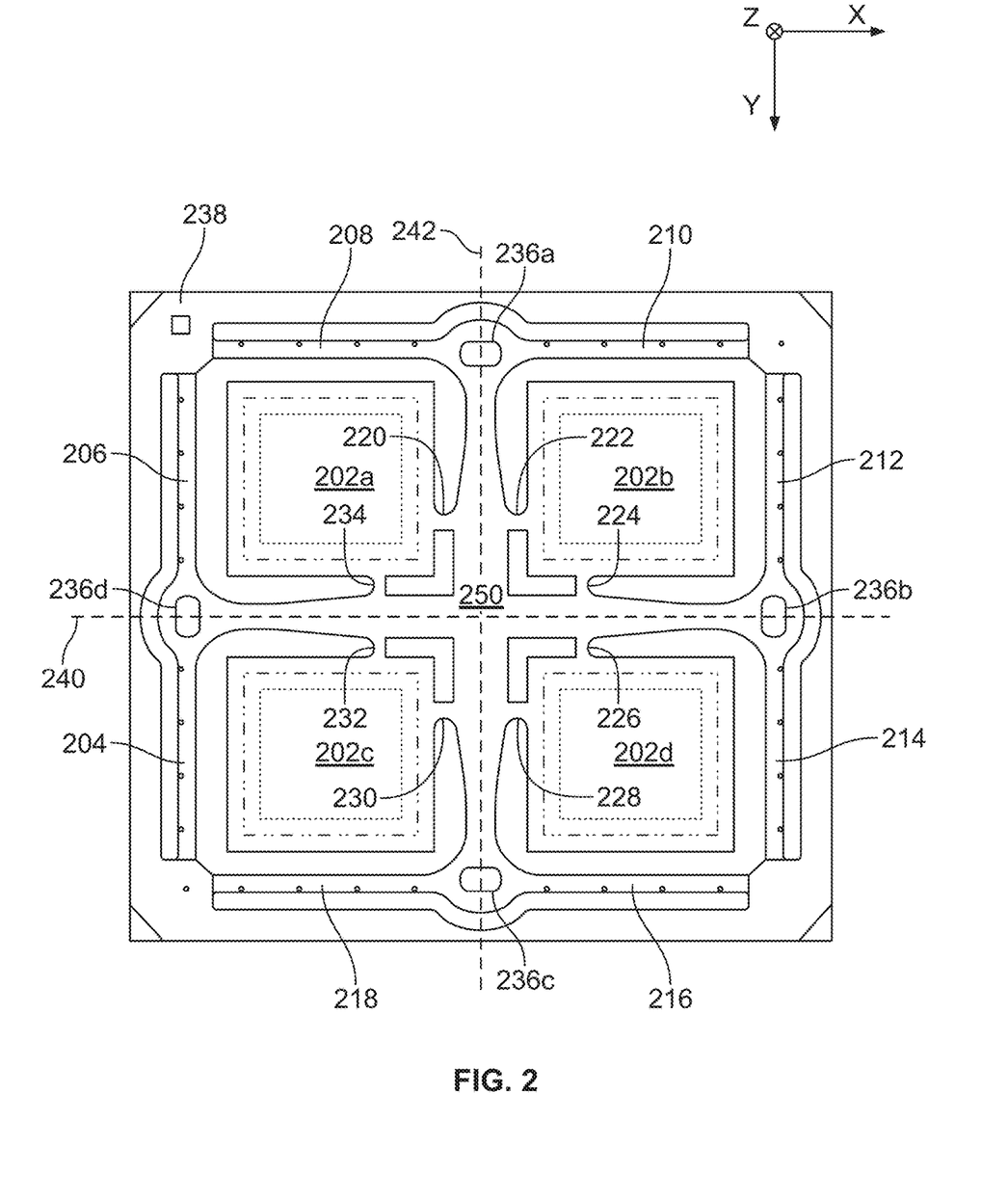
FIG. 2 shows an illustrative anchor system in accordance with an embodiment of the present disclosure.

FIG. 2 shows an illustrative anchor system in accordance with an embodiment of the present disclosure. In the depicted embodiment, system 200 includes anchors 202a, 202b, 202c, 202d, first stiffening spring 208, second stiffening spring 206, third stiffening spring 210, fourth stiffening spring 212, fifth stiffening spring 218, sixth stiffening spring 204, seventh stiffening spring 216, eighth stiffening spring 214, first compliant spring 220, second compliant spring 234, third compliant spring 222, fourth compliant spring 224, fifth compliant spring 230, sixth compliant spring 232, seventh compliant spring 228, eighth compliant spring 226, holes 236a, 236b, 236c, and 236d, proof mass 238 (e.g., only an internal portion of proof mass 238 is depicted in FIG. 2), and internal coupling mass 250. In some embodiments, system 200 may include other suitable numbers and configurations of anchors, compliant springs, stiffening springs, and/or holes in a variety of suitable orientation. Although particular components are depicted in certain configurations for system 200, it will be understood that components may be removed, modified, or substituted and that additional components (e.g., springs, electrodes, processing circuitry, etc.) may be added in certain embodiments.

For example, the compliant springs are depicted at particular respective locations along the edge of each anchor respective to the anchor end and to the other compliant spring for that same anchor, e.g., relatively close to the interior corner of each anchor. The compliant springs may thus be less than 25% of the length of a respective anchor side from a respective interior anchor edge or corner as depicted in FIG. 2. In other embodiments, the compliant springs may be located at different locations of the anchors, and there may be a greater or lesser number of anchors and/or compliant springs associated with each anchor. For example, it may be desirable for compliant springs to be located at least 20% of the length of an anchor edge away from an internal anchor corner, and no greater than 80% from such internal anchor corner. Such a configuration may allow for effective rejection of shear forces imparted on the anchor from being translated to a proof mass of the suspended spring-mass system. In some embodiments as depicted in FIG. 2, the respective compliant springs associated with a particular anchor (e.g., compliant springs 220 and 234 associated with anchor 202a) may be located at a common position relative to the internal anchor corner. In other embodiments (not depicted), the compliant springs may be located at different positions (e.g., compliant spring 220 located at approximately 25% of the length of anchor 202a from the internal anchor corner and compliant spring 234 located at approximately 33% the length of anchor 202a from the internal anchor corner).

The respective dimensions of the anchors, compliant springs, and stiffening springs may also be modified in a variety of suitable manners, while retaining the shear-rejecting properties of the anchor-compliant spring configurations and the decoupling and shock/drop protection of the stiffening springs. Although a particular number of holes are depicted at particular locations, the number, location, and size of the holes may be modified as appropriate to obtain desired qualities, such as compression and decoupling of forces between the proof anchors and the proof mass and shifting of resonant frequency modes of the suspended spring-mass system. Although the present disclosure describes a proof mass located outside of and surrounding the anchoring region and associated compliant and stiffening springs of the suspended spring-mass system, in embodiments multiple proof masses may collectively be attached to and suspended from the anchors, and the proof masses may be located at a variety of relative locations with respect to the anchors.

Proof mass 238 includes an upper plane and a lower plane that's parallel to the upper plane, where each of the upper plane and lower plane extend along a respective x-axis and y-axis. FIG. 2 depicts only an interior portion of the proof mass 238 surrounding the anchoring region, but it will be understood that the remainder of the proof mass can have a variety of shapes or configurations. In the embodiment of FIG. 2, the proof mass 238 responds to a force of interest (e.g., a z-axis linear acceleration) by moving out of the x-y plane, towards and/or away from one or more sensing electrodes (e.g., located on a substrate below the proof mass, not depicted in FIG. 2). The proof mass is only directly coupled to interior anchoring components via the stiffening springs 204, 206, 208, 210, 212, 214, 216, and 218. As described herein, the compliant springs and stiffening springs that are coupled between the proof mass 238 and each of the anchors 202a, 202b, 202c, and 202d collectively prevent shear forces that are experienced by the MEMS sensor, and thus translated to the anchors, from causing a corresponding tilt or displacement of the proof mass. In this manner, the lower surface of the proof mass 238 remains parallel and at a same distance with respect to associated sense electrodes (not depicted) in its standard position (e.g., in the absence of a sensed force such as linear acceleration).

Anchors 202a, 202b, 202c, and 202d extend into a MEMS layer of system 200 (e.g., from the base substrate and/or cap of the MEMS sensor), which includes a suspended spring-mass system that is suspended from the anchors, including proof mass 238, at least one compliant spring, at least one stiffening spring, and at least one hole. As described herein, the suspended spring-mass system of the present disclosure prevents external forces applied to the anchors (e.g., via manufacturing or use of the MEMS sensor applying forces to the substrate, cap, or MEMS layer of the MEMS sensor) from being translated to the proof mass 238. Anchor 202a couples to the suspended spring-mass system via first compliant spring 220 and second compliant spring 234, which in turn couple to associated stiffening springs 208 (e.g., associated with compliant spring 220) and 206 (e.g., associated with compliant spring 234) via an internal central coupling mass 250 of the suspended spring-mass system. Anchor 202b couples to the suspended spring-mass system via third compliant spring 222 and fourth compliant spring 224, which in turn couple to associated stiffening springs 210 (e.g., associated with compliant spring 222) and 212 (e.g., associated with compliant spring 224) via the internal coupling mass 250 of the suspended spring-mass system. Anchor 202c couples to the suspended spring-mass system via fifth compliant spring 230 and sixth compliant spring 232, which in turn couple to associated stiffening springs 218 (e.g., associated with compliant spring 230) and 204 (e.g., associated with compliant spring 232) via the internal coupling mass 250 of the suspended spring-mass system. Anchor 202d couples to the suspended spring-mass system via seventh compliant spring 228 and eighth compliant spring 226, which in turn couple to associated stiffening springs 216 (e.g., associated with compliant spring 228) and 214 (e.g., associated with compliant spring 226) via the internal coupling mass 250 of the suspended spring-mass system.

First stiffening spring 208 extends along the x-axis parallel to the first compliant spring 220 and couples between the first compliant spring 220 (e.g., via the internal coupling mass 250) and proof mass 238, such that the first stiffening spring 208 is orthogonal (e.g., perpendicular) to a direction of a force (e.g., a shear force) that causes first compliant spring 220 to rotate (e.g., to twist about an axis parallel to the first direction). First stiffening spring 208 decouples the first compliant spring 220 and its corresponding residue strain generated by a shear force along the y-axis. Due to its rigidity, first stiffening spring 208 provides shock absorption in cases of shock, tumble, or drops along the x-axis, which prevents shock from translating to proof mass 238 and the MEMS sensor from generating offset.

Second stiffening spring 206 extends along the y-axis parallel to the second compliant spring 234 and couples between the second compliant spring 234 (e.g., via the internal coupling mass 250) and proof mass 238, such that the second stiffening spring 206 is orthogonal (e.g., perpendicular) to a direction of a force (e.g., a shear force) that causes second compliant spring 234 to rotate (e.g., to twist about an axis parallel to the second direction). Second stiffening spring 206 decouples the second compliant spring 234 and its corresponding residue strain generated by a shear force along the x-axis. Due to its rigidity, second stiffening spring 206 provides shock absorption in case of shock, tumble, or drops along the y-axis, which prevents shock from translating to proof mass 238 and the MEMS sensor from generating offset.

Third stiffening spring 210 extends along the x-axis parallel to the third compliant spring 222 and couples between the third compliant spring 222 (e.g., via the internal coupling mass 250) and proof mass 238, such that the third stiffening spring 210 is orthogonal (e.g., perpendicular) to a direction of a force (e.g., a shear force) that causes third compliant spring 222 to rotate (e.g., to twist about an axis parallel to the first direction). Third stiffening spring 210 decouples the third compliant spring 222 and its corresponding residue strain generated by a shear force along the y-axis. Due to its rigidity, third stiffening spring 210 provides shock absorption in cases of shock, tumble, or drops along the x-axis, which prevents shock from translating to proof mass 238 and the MEMS sensor from generating offset.

Fourth stiffening spring 212 extends along the y-axis parallel to the fourth compliant spring 224 and couples between the fourth compliant spring 224 (e.g., via the internal coupling mass 250) and proof mass 238, such that the fourth stiffening spring 212 is orthogonal (e.g., perpendicular) to a direction of a force (e.g., a shear force) that causes fourth compliant spring 224 to rotate (e.g., to twist about an axis parallel to the second direction). Fourth stiffening spring 212 decouples the fourth compliant spring 224 and its corresponding residue strain generated by a shear force along the x-axis. Due to its rigidity, fourth stiffening spring 212 provides shock absorption in case of shock, tumble, or drops along the y-axis, which prevents shock from translating to proof mass 238 and the MEMS sensor from generating offset.

Fifth stiffening spring 218 extends along the x-axis parallel to the fifth compliant spring 230 and couples between the fifth compliant spring 230 (e.g., via the internal coupling mass 250) and proof mass 238, such that the fifth stiffening spring 218 is orthogonal (e.g., perpendicular) to a direction of a force (e.g., a shear force) that causes fifth compliant spring 230 to rotate (e.g., to twist about an axis parallel to the first direction). Fifth stiffening spring 218 decouples the fifth compliant spring 230 and its corresponding residue strain generated by a shear force along the y-axis. Due to its rigidity, fifth stiffening spring 218 provides shock absorption in cases of shock, tumble, or drops along the x-axis, which prevents shock from translating to proof mass 238 and the MEMS sensor from generating offset.

Sixth stiffening spring 204 extends along the y-axis parallel to the sixth compliant spring 232 and couples between the sixth compliant spring 204 (e.g., via the internal coupling mass 250) and proof mass 238, such that the sixth stiffening spring 204 is orthogonal (e.g., perpendicular) to a direction of a force (e.g., a shear force) that causes sixth compliant spring 232 to rotate (e.g., to twist about an axis parallel to the second direction). Sixth stiffening spring 204 decouples the sixth compliant spring 232 and its corresponding residue strain generated by a shear force along the x-axis. Due to its rigidity, sixth stiffening spring 204 provides shock absorption in cases of shock, tumble, or drops along the y-axis, which prevents shock from translating to proof mass 238 and the MEMS sensor from generating offset.

Seventh stiffening spring 216 extends along the x-axis parallel to the seventh compliant spring 228 and couples between the seventh compliant spring 228 (e.g., via the internal coupling mass 250) and proof mass 238, such that the seventh stiffening spring 216 is orthogonal (e.g., perpendicular) to a direction of a force (e.g., a shear force) that causes seventh compliant spring 228 to rotate (e.g., to twist about an axis parallel to the first direction). Seventh stiffening spring 216 decouples the seventh compliant spring 228 and its corresponding residue strain generated by a shear force along the y-axis. Due to its rigidity, seventh stiffening spring 216 provides shock absorption in cases of shock, tumble, or drops along the x-axis, which prevents shock from translating to proof mass 238 and the MEMS sensor from generating offset.

Eighth stiffening spring 214 extends along the y-axis parallel to the eighth compliant spring 226 and couples between the eighth compliant spring 226 (e.g., via the internal coupling mass 250) and proof mass 238, such that the eighth stiffening spring 214 is orthogonal (e.g., perpendicular) to a direction of a force (e.g., a shear force) that causes eighth compliant spring 214 to rotate (e.g., to twist about an axis parallel to the second direction). Eighth stiffening spring 214 decouples the eighth compliant spring 226 and its corresponding residue strain generated by a shear force along the x-axis. Due to its rigidity, eighth stiffening spring 214 provides shock absorption in cases of shock, tumble, or drops along the y-axis, which prevents shock from translating to proof mass 238 and the MEMS sensor from generating offset.

First compliant spring 220 connects between anchor 202a and proof mass 238. First compliant spring 220 connects to anchor 202a and to the internal coupling mass 250, which in turn is coupled to the stiffening springs (e.g., including associated first stiffening spring 208) that connect to proof mass 238. In response to a shear force along the y-axis, first compliant spring 220 rotates about the x-axis. First compliant spring 220 is located approximately 25% of the length of anchor 202a's vertical side from anchor 202a's edge (e.g., the interior corner edge of anchor 202a), although it may be located in other locations (e.g., other edges or other positions along a particular edge, etc.) in some embodiments.

Second compliant spring 234 connects between anchor 202a and proof mass 238. Second compliant spring 234 connects to anchor 202a and to the internal coupling mass 250, which in turn is coupled to the stiffening springs (e.g., including associated second stiffening spring 206) that connect to proof mass 238. In response to a shear force along the x-axis, second compliant spring 234 rotates about the y-axis. Second compliant spring 234 is located approximately 25% of the length of anchor 202a's horizontal side from anchor 202's edge (e.g., the interior corner edge of anchor 202a), although it may be located in other locations (e.g., other edges or other positions along a particular edge, etc.) in some embodiments.

Third compliant spring 222 connects between anchor 202b and proof mass 238. Third compliant spring 222 connects to anchor 202b and to the internal coupling mass 250, which in turn is coupled to the stiffening springs (e.g., including associated third stiffening spring 210) that connect to proof mass 238. In response to a shear force along the y-axis, third compliant spring 222 rotates about the x-axis. Third compliant spring 222 is located approximately 25% of the length of anchor 202b's vertical side from anchor 202b's edge (e.g., the interior corner edge of anchor 202b), although it may be located in other locations (e.g., other edges or other positions along a particular edge, etc.) in some embodiments.

Fourth compliant spring 224 connects between anchor 202b and proof mass 238. Fourth compliant spring 224 connects to anchor 202b and to the internal coupling mass 250, which in turn is coupled to the stiffening springs (e.g., including associated fourth stiffening spring 212) that connect to proof mass 238. In response to a shear force along the x-axis, fourth compliant spring 224 rotates about the y-axis. Fourth compliant spring 224 is located approximately 25% of the length of anchor 202b's horizontal side from anchor 202b's edge (e.g., the interior corner edge of anchor 202b), although it may be located in other locations (e.g., other edges or other positions along a particular edge, etc.) in some embodiments.

Fifth compliant spring 230 connects between anchor 202c and proof mass 238. Fifth compliant spring 230 connects to anchor 202c and to the internal coupling mass 250, which in turn is coupled to the stiffening springs (e.g., including associated fifth stiffening spring 218) that connect to proof mass 238. In response to a shear force along the y-axis, fifth compliant spring 230 rotates about the x-axis. Fifth compliant spring 230 is located approximately 25% of the length of anchor 202c's vertical side from anchor 202c's edge (e.g., the interior corner edge of anchor 202c), although it may be located in other locations (e.g., other edges or other positions along a particular edge, etc.) in some embodiments.

Sixth compliant spring 232 connects between anchor 202c and proof mass 238. Sixth compliant spring 232 connects to anchor 202c and to the internal coupling mass 250, which in turn is coupled to the stiffening springs (e.g., including associated sixth stiffening spring 204) that connect to proof mass 238. In response to a shear force along the x-axis, sixth compliant spring 232 rotates about the y-axis. Sixth compliant spring 232 is located approximately 25% of the length of anchor 202c's horizontal side from anchor 202c's edge (e.g., the interior corner edge of anchor 202c), although it may be located in other locations (e.g., other edges or other positions along a particular edge, etc.) in some embodiments.

Seventh compliant spring 228 connects between anchor 202d and proof mass 238. Seventh compliant spring 228 connects to anchor 202d and to the internal coupling mass 250, which in turn is coupled to the stiffening springs (e.g., including associated seventh stiffening spring 216) that connect to proof mass 238. In response to a shear force along the y-axis, seventh compliant spring 228 rotates about the x-axis. Seventh compliant spring 228 is located approximately 25% of the length of anchor 202d's vertical side from anchor 202d's edge (e.g., the interior corner edge of anchor 202d), although it may be located in other locations (e.g., other edges or other positions along a particular edge, etc.) in some embodiments.

Eighth compliant spring 226 connects between anchor 202d and proof mass 238. Eighth compliant spring 226 connects to anchor 202d and to the internal coupling mass 250, which in turn is coupled to the stiffening springs (e.g., including associated eighth stiffening spring 214) that connect to proof mass 238. In response to a shear force along the x-axis, eighth compliant spring 226 rotates about the y-axis. Eighth compliant spring 226 is located approximately 25% of the length of anchor 202d's horizontal side from anchor 202d's edge (e.g., the interior corner edge of anchor 202d), although it may be located in other locations (e.g., other edges or other positions along a particular edge, etc.) in some embodiments.

Hole 236a is located between first stiffening spring 208 and third stiffening spring 210 along the y-axis. Hole 236a reduces the overall mass of the coupling structure (e.g., between the anchors and proof mass 238) while providing compliance (e.g., by compressing or expanding hole 236a depending on the direction of the force) to shear and/or shock forces. For example, hole 236a may provide compliance between stiffening springs 208 and 210 in the x-axis direction and compliance to forces imparted on the internal coupling mass 250 in the y-axis direction.

Hole 236b is located between fourth stiffening spring 212 and eighth stiffening spring 214 along the x-axis. Hole 236b reduces the overall mass of the coupling structure (e.g., between the anchors and proof mass 238) while providing compliance (e.g., by compressing or expanding hole 236b depending on the direction of the force) to shear and/or shock forces. For example, hole 236b may provide compliance between stiffening springs 212 and 214 in the y-axis direction and compliance to forces imparted on the internal coupling mass 250 in the x-axis direction.

Hole 236c is located between fifth stiffening spring 218 and seventh stiffening spring 216 along the y-axis. Hole 236c reduces the overall mass of the coupling structure (e.g., between the anchors and proof mass 238) while providing compliance (e.g., by compressing or expanding hole 236c depending on the direction of the force) to shear and/or shock forces. For example, hole 236c may provide compliance between stiffening springs 218 and 216 in the x-axis direction and compliance to forces imparted on the internal coupling mass 250 in the y-axis direction.

Hole 236d is located between sixth stiffening spring 204 and second stiffening spring 206 along the x-axis. Hole 236d reduces the overall mass of the coupling structure (e.g., between the anchors and proof mass 238) while providing compliance (e.g., by compressing or expanding hole 236d depending on the direction of the force) to shear and/or shock forces. For example, hole 236d may provide compliance between stiffening springs 204 and 206 in the y-axis direction and compliance to forces imparted on the internal coupling mass 250 in the x-axis direction.

Collectively, the holes 236a 236b, 236c, and 236d modify the resonant frequency of the overall structure in a manner that avoids creating excessive forces at common frequencies experienced by the particular MEMS sensor. Although a particular number of holes having particular shapes and locations are depicted in FIG. 2, it will be understood that additional or fewer holes may be located at alternative and/or additional locations and may have a variety of shapes such as to reduce particular shocks and or forces that may be imparted on the system.

Anchor system 200, and each associated component (e.g., anchors, compliant springs, stiffening springs, and holes) mentioned above, is respectively symmetric about y-axis symmetry line 242 and x-axis symmetry line 240. Specifically, anchor 202a and its associated springs and masses are symmetric with anchor 202b and its associated springs and masses about y-axis symmetry line 242 and with anchor 202c and its associated springs and masses about x-axis symmetry line 240. Anchor 202b and its associated springs and masses are symmetric with anchor 202a and its associated springs and masses about y-axis symmetry line 242 and with anchor 202d and its associated springs and masses about x-axis symmetry line 240. Anchor 202c and its associated springs and masses are symmetric with anchor 202d and its associated springs and masses about y-axis symmetry line 242 and with anchor 202a and its associated springs and masses about x-axis symmetry line 240. Anchor 202d and its associated springs and masses are symmetric with anchor 202c and its associated springs and masses about y-axis symmetry line 242 and with anchor 202b and its associated springs and masses about x-axis symmetry line 240. In this manner, symmetry of the anchoring system exists about both x-axis and y-axis symmetry lines, providing similar responses to forces along either axis.

Figure 3:
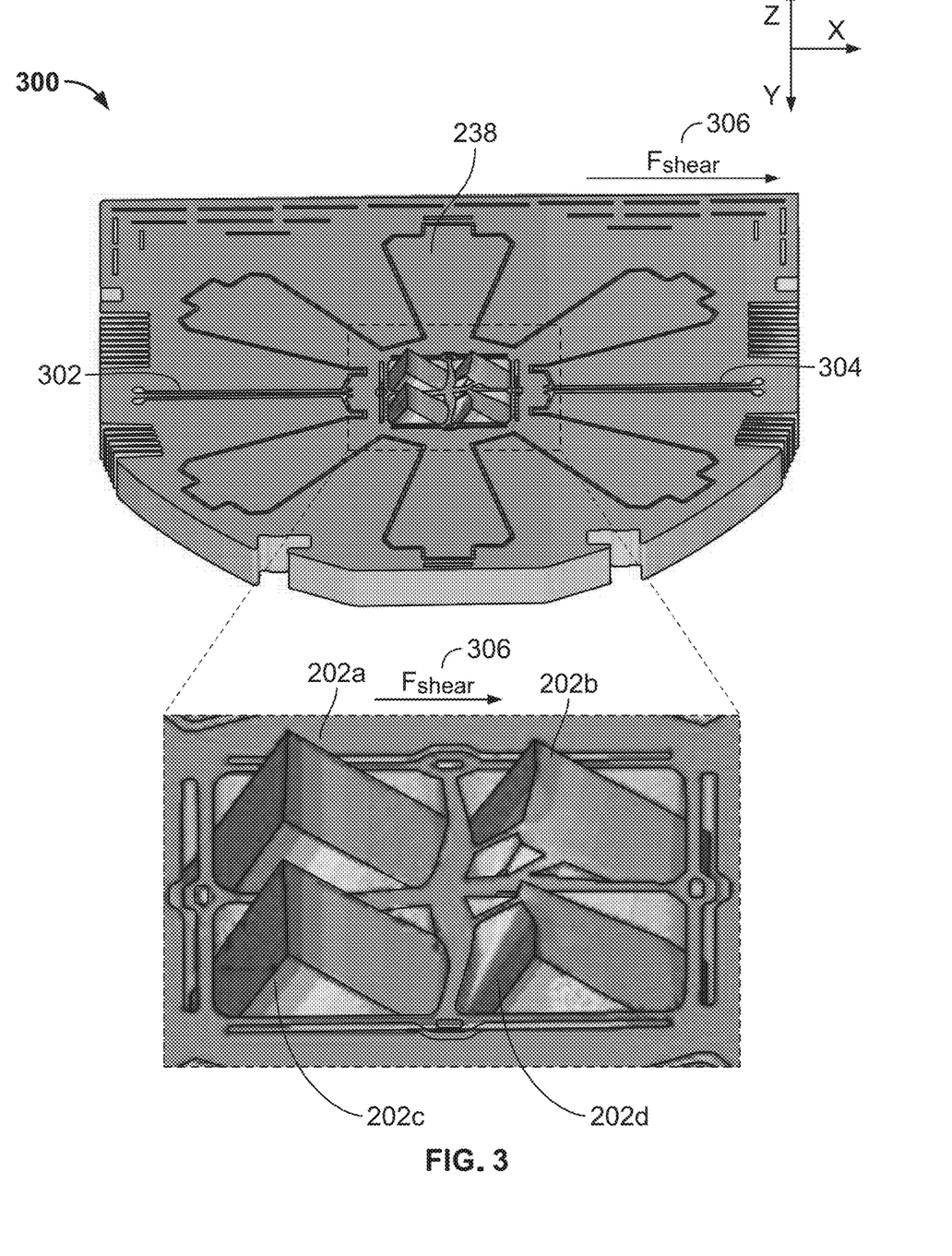
FIG. 3 shows exemplary tilt cancellation by compliant springs attached to anchors experiencing a shear force along a first direction, in accordance with an embodiment of the present disclosure.

FIG. 3 shows exemplary tilt cancellation by compliant springs attached to anchors experiencing a shear force 306 along an x-axis, in accordance with an embodiment of the present disclosure. System 300 includes proof mass 238, anchors 202a, 202b, 202c, and 202d, and compliant springs and stiffening springs as described in FIG. 2. In addition, the depicted embodiment of system 300 includes proof mass springs 302, 304. In some embodiments, system 300 may include any suitable number of springs, anchors, compliant springs, stiffening springs, and holes in any suitable orientation. Although particular components are depicted in certain configurations for system 300, it will be understood that components may be removed, modified, or substituted and that additional components (e.g., sense springs, electrodes, processing circuitry, etc.) may be added in certain embodiments.

System 300 depicts an exemplary tilt cancellation by compliant springs (partially visible) attached to anchors 202a, 202b, 202c, and 202d in response to an external force (e.g., an x-axis shear force) applied to the MEMS sensor. Anchors 202a, 202b, 202c, and 202d extend into a MEMS layer of system 300 (e.g., from the substrate and/or cap layer of the MEMS sensor), which includes a suspended spring-mass system that is suspended from anchors 202a, 202b, 202c, and 202d via compliant springs and stiffening springs. In some embodiments, shear force 306 may result in a shift of one or more of a base substrate or cap substrate, causing tilting of one or more of anchors 202a, 202b, 202c, and 202d, as depicted in FIG. 3 in the x-axis direction within the MEMS layer. In response to the tilting of the anchors, a subset of the compliant springs (partially visible, e.g., connected to anchor 202b) that are oriented along the y-axis (e.g., second compliant spring 234, fourth compliant spring 224, sixth compliant spring 232, and eighth compliant spring 226 of FIG. 2) rotate about respective y-axes to absorb the force associated with the anchor tilting. For example, second compliant spring 234 and sixth compliant spring 232 may rotate about a first common y-axis while fourth compliant spring 224 and eighth compliant spring 226 rotate about a second common y-axis. Concurrently, associated stiffening springs oriented in the y-axis direction (e.g., second stiffening spring 206, fourth stiffening spring 212, sixth stiffening spring 204, and eighth stiffening spring 214 of FIG. 2) decouple the respective rotations of the compliant springs and their corresponding residue strain generated by shear force 306 from the proof mass 238. The rejection of shear force 306 along the x-axis, as depicted in FIG. 3, causes the proof mass 238 to retain its orientation within the x-y plane despite the shear force and tilting of the anchors, resulting in the proof mass 238 retaining its offset (e.g., relative position) with respect to other components such as sense electrodes located on a base substrate layer (not depicted) parallel to the proof mass 238 below the proof mass 238.

Figure 4:
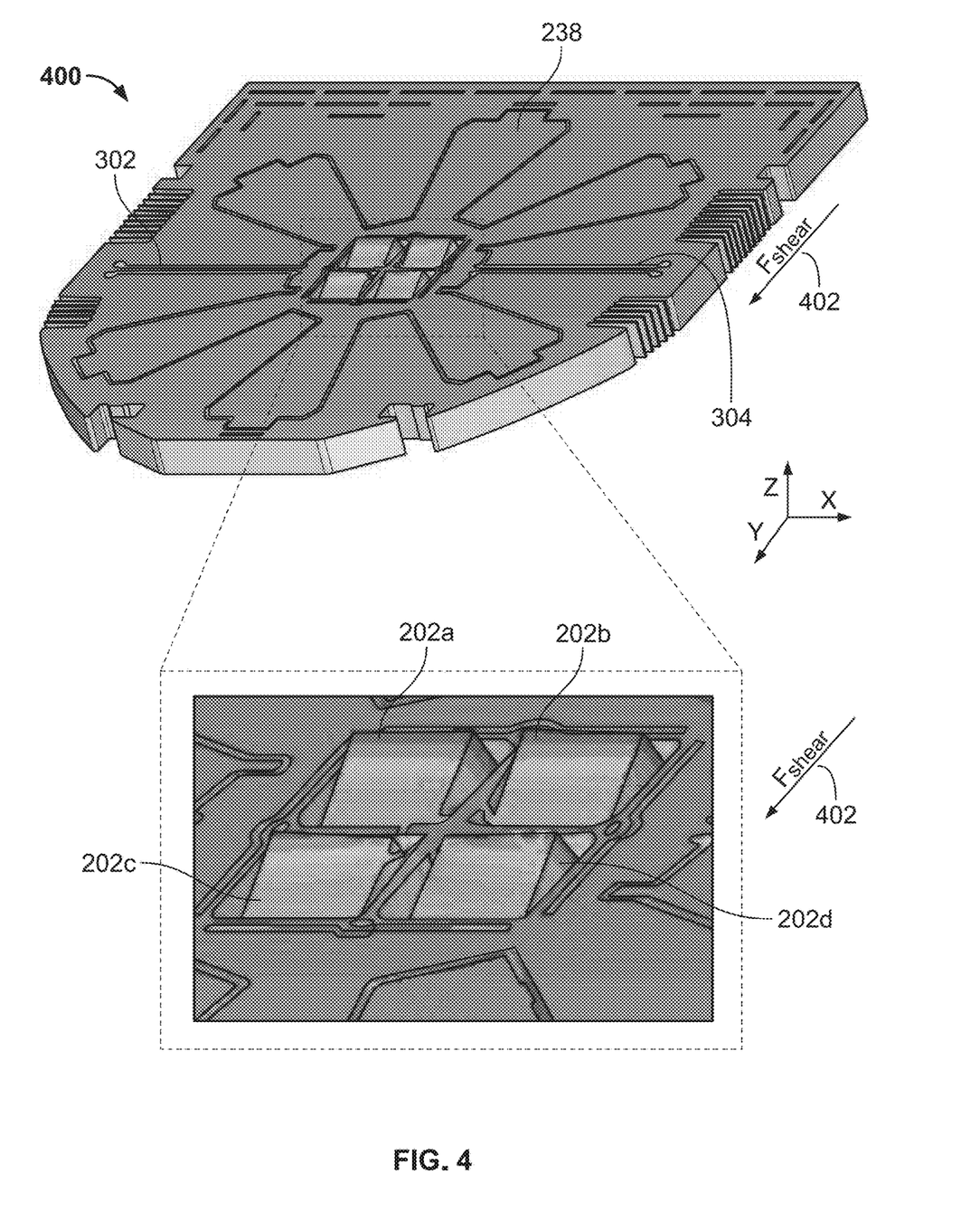
FIG. 4 shows exemplary tilt cancellation by compliant springs attached to anchors experiencing a shear force along a second direction, in accordance with an embodiment of the present disclosure.

FIG. 4 shows exemplary tilt cancellation by compliant springs attached to anchors experiencing a shear force 402 along a y-axis, in accordance with an embodiment of the present disclosure. System 400 includes proof mass 238, anchors 202a, 202b, 202c, and 202d, and compliant springs and stiffening springs as described in FIG. 2. In addition, the depicted embodiment of system 400 includes proof mass springs 302, 304. In some embodiments, system 400 may include any suitable number of springs, anchors, compliant springs, stiffening springs, and holes in any suitable orientation. Although particular components are depicted in certain configurations for system 400, it will be understood that components may be removed, modified, or substituted and that additional components (e.g., sense springs, electrodes, processing circuitry, etc.) may be added in certain embodiments.

System 400 depicts an exemplary tilt cancellation by compliant springs (partially visible) attached to anchors 202a, 202b, 202c, and 202d in response to an external force (e.g., a y-axis shear force) applied to the MEMS sensor. Anchors 202a, 202b, 202c, and 202d extend into a MEMS layer of system 400 (e.g., from the substrate and/or cap layer of the MEMS sensor), which includes a suspended spring-mass system that is suspended from anchors 202a, 202b, 202c, and 202d via compliant springs and stiffening springs. In some embodiments, shear force 402 may result in a shift of one or more of a base substrate or cap substrate, causing tilting of one or more of anchors 202a, 202b, 202c, and 202d, as depicted in FIG. 4 in the y-axis direction within the MEMS layer. In response to the tilting of the anchors, a subset of the compliant springs (partially visible, e.g., connected to anchor 202b) that are oriented along the x-axis (e.g., first compliant spring 220, third compliant spring 222, fifth compliant spring 230, and seventh compliant spring 228 of FIG. 2) rotate about respective x-axes to absorb the force associated with the anchor tilting. For example, first compliant spring 220 and third compliant spring 222 may rotate about a first common x-axis while fifth compliant spring 230 and seventh compliant spring 228 rotate about a second common y-axis. Concurrently, associated stiffening springs oriented in the x-axis direction (e.g., first stiffening spring 208, third stiffening spring 210, fifth stiffening spring 218, and seventh stiffening spring 216 of FIG. 2) decouple the respective rotations of the compliant springs and their corresponding residue strain generated by shear force 402 from the proof mass 238. The rejection of shear force 402 along the y-axis, as depicted in FIG. 4, causes the proof mass 238 to retain its orientation within the x-y plane despite the shear force and tilting of the anchors, resulting in the proof mass 238 retaining its offset (e.g., relative position) with respect to other components such as sense electrodes located on a base substrate layer (not depicted) parallel to the proof mass 238 below the proof mass 238.

Figure 5:
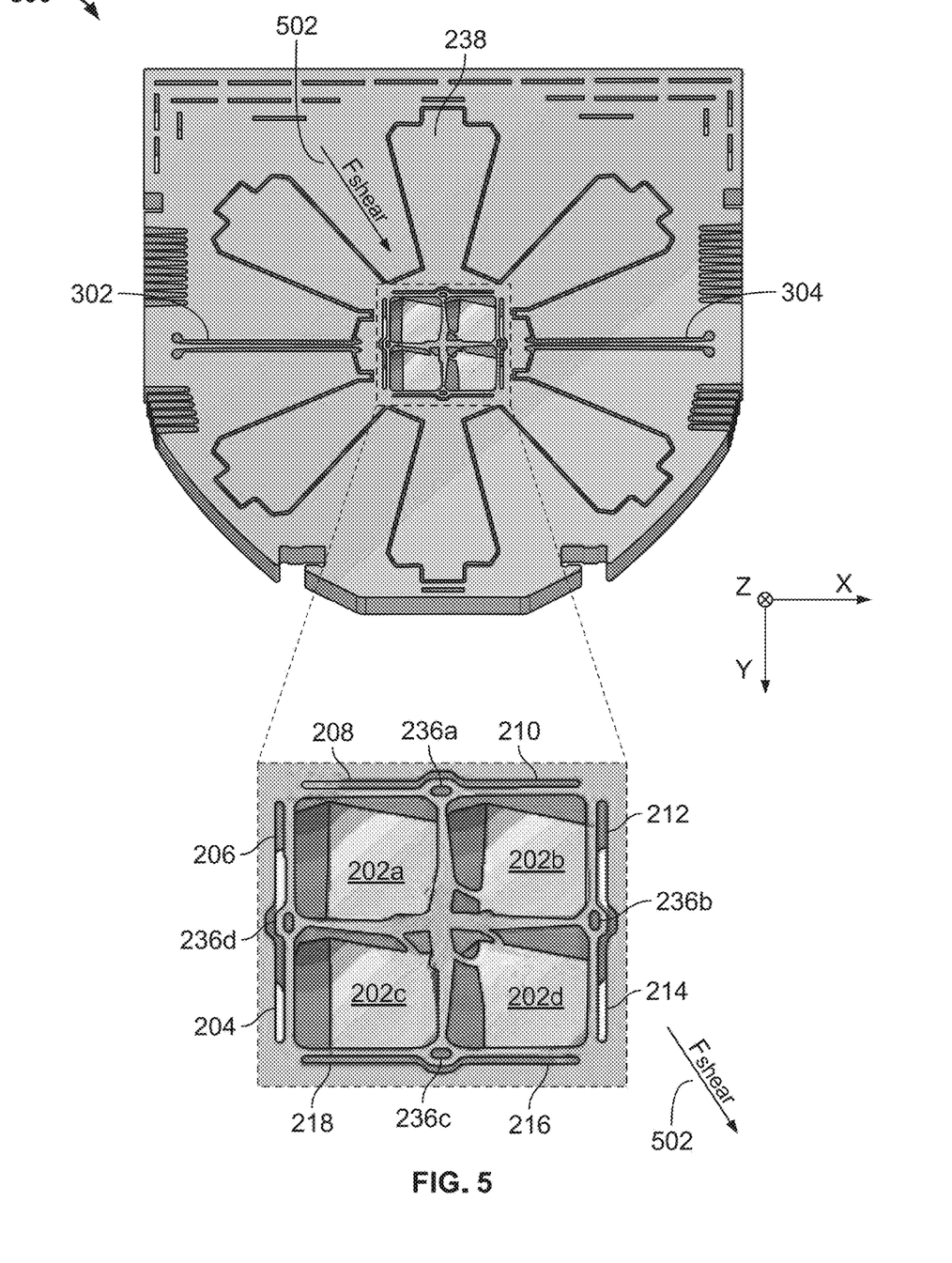
FIG. 5 shows exemplary tilt cancellation by compliant springs attached to anchors in response to a shear force in along both first and second directions, in accordance with an embodiment of the present disclosure.

FIG. 5 shows exemplary tilt cancellation by compliant springs attached to anchors experiencing a shear force 502 at an angle within an x-y plane, in accordance with an embodiment of the present disclosure. System 500 includes proof mass 238, anchors 202a, 202b, 202c, and 202d, and compliant springs and stiffening springs as described in FIG. 2. In addition, the depicted embodiment of system 400 includes proof mass springs 302, 304. In some embodiments, system 500 may include any suitable number of springs, anchors, compliant springs, stiffening springs, and holes in any suitable orientation. Although particular components are depicted in certain configurations for system 500, it will be understood that components may be removed, modified, or substituted and that additional components (e.g., sense springs, electrodes, processing circuitry, etc.) may be added in certain embodiments.

System 500 depicts an exemplary tilt cancellation by compliant springs (partially visible) attached to anchors 202a, 202b, 202c, and 202d in response to an external force (e.g., an x-y plane shear force) applied to the MEMS sensor. Anchors 202a, 202b, 202c, and 202d extend into a MEMS layer of system 500 (e.g., from the substrate and/or cap layer of the MEMS sensor), which includes a suspended spring-mass system that is suspended from anchors 202a, 202b, 202c, and 202d via compliant springs and stiffening springs. In some embodiments, shear force 502 may result in a shift of one or more of a base substrate or cap substrate, causing tilting of one or more of anchors 202a, 202b, 202c, and 202d, as depicted in FIG. 5 at an angle within the x-y plane (e.g., 45 degrees depicted in FIG. 5, although the present configuration will reject shear forces at any angle within the x-y plane) within the MEMS layer. In response to the tilting of the anchors, each of the compliant springs (partially visible, e.g., connected to anchor 202b) rotates about a respective axis of rotation (e.g., respective x-axes for first compliant spring 220, third compliant spring 222, fifth compliant spring 230, and seventh compliant spring 228 and respective y-axes for second compliant spring 234, fourth compliant spring 224, sixth compliant spring 232, and eighth compliant spring 226) to absorb the force associated with the anchor tilting. For example, first compliant spring 220 and third compliant spring 222 may rotate about a first common x-axis while fifth compliant spring 230 and seventh compliant spring 228 rotate about a second common x-axis, and second compliant spring 234 and sixth compliant spring 232 may rotate about a first common y-axis while fourth compliant spring 224 and eighth compliant spring 226 rotate about a second common y-axis. Concurrently, associated stiffening springs oriented in the x-axis direction (e.g., first stiffening spring 208, third stiffening spring 210, fifth stiffening spring 218, and seventh stiffening spring 216 of FIG. 2) decouple the respective rotations of the x-axis compliant springs in response to shear force 502, while associated stiffening springs oriented in the y-axis direction (e.g., second stiffening spring 206, fourth stiffening spring 212, sixth stiffening spring 204, and eighth stiffening spring 214 of FIG. 2) decouple the respective rotations of the y-axis compliant springs in response to shear force 502. The rejection of shear force 502 within x-y plane, as depicted in FIG. 5, causes the proof mass 238 to retain its orientation within the x-y plane despite the shear force and tilting of the anchors, resulting in the proof mass 238 retaining its offset (e.g., relative position) with respect to other components such as sense electrodes located on a base substrate layer (not depicted) parallel to the proof mass 238 below the proof mass 238.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A microelectromechanical system (MEMS) sensor, comprising:
   at least one anchor that extends into a MEMS layer; and
   a suspended spring-mass system located in the MEMS layer that extends along a first direction and a second direction and comprises a proof mass and a coupling mass connected to the proof mass, the proof mass configured to move in a third direction in response to an external excitation, wherein the first direction, second direction, and third direction are orthogonal to each other, the proof mass extending along the first and second directions in an initial orientation when at rest, and the at least one anchor displaceable from an initial position at rest to a tilted position in response to a shear force applied to the MEMS sensor in a plane defined by the first and second directions;
   a first compliant spring connected between the at least one anchor and the coupling mass, wherein the first compliant spring is configured to rotate about a first axis extending in the first direction in response to a first component of the shear force along the second direction and maintain the proof mass in the initial orientation when the first component of the shear force is applied to the MEMS sensor;
   a second compliant spring connected between the at least one anchor and the coupling mass, wherein the second compliant spring is configured to rotate about a second axis extending in the second direction in response to a second component of the shear force along the first direction and maintain the proof mass in the initial orientation when the second component of the shear force is applied to the MEMS sensor, and
   a first stiffening spring extending along the first direction parallel to the first axis; and
   a second stiffening spring extending along the second direction parallel to the second axis, wherein
   the first stiffening spring and the second stiffening spring connect the proof mass to the coupling mass.

2. The MEMS sensor of claim 1, wherein the first stiffening spring decouples the first compliant spring, and wherein the second stiffening spring decouples the second compliant spring.

3. The MEMS sensor of claim 1, wherein the first compliant spring and the second compliant spring are each located at 20%-80% of the length of a respective anchor side from a respective anchor edge.

4. The MEMS sensor of claim 1, wherein the at least one anchor comprises a first anchor, a second anchor, a third anchor, and a fourth anchor, and wherein the first compliant spring and the second compliant spring are connected to the first anchor, further comprising:
   a third compliant spring connected between the second anchor and the suspended spring-mass system, wherein the third compliant spring rotates about a third axis extending in the first direction in response to a shear force along the second direction;
   a fourth compliant spring connected between the second anchor and the suspended spring-mass system, wherein the fourth compliant spring rotates about a fourth axis extending in the second direction in response to a shear force along the first direction;
   a fifth compliant spring connected between the third anchor and the suspended spring-mass system, wherein the fifth compliant spring rotates about a fifth axis extending in the first direction in response to a shear force along the second direction;

a sixth compliant spring connected between the third anchor and the suspended system, wherein the sixth compliant spring rotates about a sixth axis extending in the second direction in response to a shear force along the first direction;

a seventh compliant spring connected between the fourth anchor and the suspended spring-mass system, wherein the seventh compliant spring rotates about a seventh axis extending in the first direction in response to a shear force along the direction; and an eighth compliant spring connected between the fourth anchor and the suspended spring-mass system, wherein the eighth compliant spring rotates about an eighth axis extending in the second direction in response to a shear force along the first direction.

5. The MEMS sensor of claim 4, further comprising:
a first stiffening spring extending along the first direction parallel to the first axis;
a second stiffening spring extending along the second direction parallel to the second axis;
a third stiffening spring extending along the first direction parallel to the third axis;
a fourth stiffening spring extending along the second direction parallel to the fourth axis;
a fifth stiffening spring extending along the first direction parallel to the fifth axis;
a sixth stiffening spring extending along the second direction parallel to the sixth axis;
a seventh stiffening spring extending along the first direction parallel to the seventh axis;
an eighth stiffening spring extending along the second direction parallel to the eighth axis.

6. The MEMS sensor of claim 5, wherein the first stiffening spring decouples the first compliant spring, the second stiffening spring decouples the second compliant spring, the third stiffening spring decouples the third compliant spring, the fourth stiffening spring decouples the fourth compliant spring, the fifth stiffening spring decouples the fifth compliant spring, the sixth stiffening spring decouples the sixth compliant spring, the seventh stiffening spring decouples the seventh compliant spring, and the eighth stiffening spring decouples the eighth compliant spring.

7. The MEMS sensor of claim 5, wherein the first axis and the third axis comprise a first common axis, the second axis and the sixth axis comprise a second common axis, the fifth axis and the seventh axis comprise a third common axis, and the fourth axis and the eighth axis comprise a fourth common axis.

8. The MEMS sensor of claim 5, further comprising:
a first hole along the second direction between the first stiffening spring and the third stiffening spring;
a second hole along the first direction between the fourth stiffening spring and the eighth stiffening spring;
a third hole along the second direction between the fifth stiffening spring and the seventh stiffening spring; and
a fourth hole along the first direction between the second stiffening spring and the sixth stiffening spring.

9. The MEMS sensor of claim 8, wherein the first hole shifts a first resonant frequency mode of the first compliant spring and a third resonant frequency mode of the third compliant spring, wherein the second hole shifts a fourth resonant frequency mode of the fourth compliant spring and an eighth resonant frequency mode of the eighth compliant spring, wherein the third hole shifts a fifth resonant frequency mode of the fifth compliant spring and a seventh resonant frequency mode of the seventh compliant spring, and wherein the fourth hole shifts a second resonant frequency mode of the second compliant spring and a sixth resonant frequency mode of the sixth compliant spring.

10. The MEMS sensor of claim 8, wherein the first, second, third, and fourth holes are ovular.

11. The MEMS sensor of claim 5, wherein the four anchors, the eighth compliant springs, and the eighth stiffening springs are located inside the proof mass.

12. The MEMS sensor of claim 5, wherein the first and the second anchor, the first, second, third, and fourth compliant springs, and the first, second, third, and fourth stiffening springs are located on one side of a first direction symmetry line and are symmetric with the third and fourth anchor, the fifth, sixth, seventh, and eighth compliant springs, and the fifth, sixth, seventh, and eighth stiffening springs located on an opposite side of the first direction symmetry line.

13. The MEMS sensor of claim 5, wherein the first and third anchor, the first, second, fifth, and sixth compliant springs, and the first, second, fifth, and sixth stiffening springs are located on one side of a second direction symmetry line and are symmetric with the second and fourth anchor, the third, fourth, seventh, and eighth compliant springs, and the third, fourth, seventh, and eighth stiffening springs located on an opposite side of the second direction symmetry line.

14. The MEMS sensor of claim 4, wherein the first compliant spring and the second compliant spring are each located at 20%-80% of the length of a respective anchor side from a first corner of the first anchor, the third compliant spring and the fourth compliant spring are each located at 20%-80% of the length of a respective anchor side from a second corner of the second anchor, the fifth compliant spring and the sixth compliant spring are each located at 20%-80% of the length of a respective anchor side from a third corner of the third anchor, and wherein the seventh compliant spring and the eighth compliant spring are each located at 20%-80% of the length of a respective anchor side from a fourth corner of the fourth anchor.

15. A microelectromechanical system (MEMS) sensor, comprising:
at least one anchor that extends into a MEMS layer, wherein the at least one anchor comprises a first anchor, a second anchor, a third anchor, and a fourth anchor;
a suspended spring-mass system located in the MEMS layer that extends along a first direction and a second direction and comprises a proof mass and a coupling mass connected to the proof mass, the proof mass configured to move in a third direction in response to an external excitation, wherein the first direction, second direction, and third direction are orthogonal to each other, the proof mass extending along the first and second directions in an initial orientation when at rest, and the first, second, third, and fourth anchors each displaceable from an initial position when at rest to a tilted position in response to a shear force applied to the MEMS sensor in a plane defined by the first and second directions;
a first compliant spring connected between the first anchor and the coupling mass, wherein the first compliant spring is configured to rotate about a first axis extending in the first direction in response to a component of the shear force along the second direction;
a second compliant spring connected between the first anchor and the coupling mass, wherein the second compliant spring is configured to rotate about a second axis extending in the second direction in response to a component of the shear force along the first direction;

a third compliant spring connected between the second anchor and the coupling mass, wherein the third compliant spring is configured to rotate about a third axis extending in the first direction in response to the component of the shear force along the second direction;

a fourth compliant spring connected between the second anchor and the coupling mass, wherein the fourth compliant spring is configured to rotate about a fourth axis extending in the second direction in response to the component of the shear force along the first direction;

a fifth compliant spring connected between the third anchor and the coupling mass, wherein the fifth compliant spring is configured to rotate about a fifth axis extending in the first direction in response to the component of the shear force along the second direction;

a sixth compliant spring connected between the third anchor and the coupling mass, wherein the sixth compliant spring is configured to rotate about a sixth axis extending in the second direction in response to a-the component of the shear force along the first direction;

a seventh compliant spring connected between the fourth anchor and the coupling mass, wherein the seventh compliant spring is configured to rotate about a seventh axis extending in the first direction in response to the component of the shear force along the second direction;

an eighth compliant spring connected between the fourth anchor and the coupling mass, wherein the eighth compliant spring is configured to rotate about an eighth axis extending in first axis extending in the second direction in response to the component of the shear force along the first direction;

a first stiffening spring extending along the first direction parallel to the first axis;

a second stiffening spring extending along the second direction parallel to the second axis;

a third stiffening spring extending along the first direction parallel to the first axis;

a fourth stiffening spring extending along the second direction parallel to the second axis;

a fifth stiffening spring extending along the first direction parallel to the first axis;

a sixth stiffening spring extending along the second direction parallel to the second axis;

a seventh stiffening spring extending along the first direction parallel to the first axis; and an eighth stiffening spring extending along the second direction parallel to the second axis; wherein the first stiffening spring, the second stiffening spring, the third stiffening spring, the fourth stiffening spring, the fifth stiffening spring, the sixth stiffening spring, the seventh stiffening spring, and the eighth stiffening spring connect the proof mass to the coupling mass;

wherein the first, third, fifth, and seventh compliant springs and maintain the proof mass in the initial orientation when the second component of the shear force is applied to the MEMS sensor and the second, fourth, sixth, and eighth compliant springs maintain the proof mass in the initial orientation when the second component of the shear force is applied to the MEMS sensor.

16. The MEMS sensor of claim 15, wherein the first stiffening spring decouples the first compliant spring, the second stiffening spring decouples the second compliant spring, the third stiffening spring decouples the third compliant spring, the fourth stiffening spring decouples the fourth compliant spring, the fifth stiffening spring decouples the fifth compliant spring, the sixth stiffening spring decouples the sixth compliant spring, the seventh stiffening spring decouples the seventh compliant spring, and the eighth stiffening spring decouples the eighth compliant spring.

17. The MEMS sensor of claim 15, further comprising:
a first hole along the second direction between the first stiffening spring and the third stiffening spring;
a second hole along the first direction between the fourth stiffening spring and the eighth stiffening spring;
a third hole along the second direction between the fifth stiffening and the seventh stiffening spring; and
a fourth hole along the first direction between the second stiffening spring and the sixth stiffening spring.

18. The MEMS sensor of claim 15, wherein the first axis and the third axis comprise a first common axis, the second axis and the sixth axis comprise a second common axis, the fifth axis and the seventh axis comprise a third common axis, and the fourth axis and the eighth axis comprise a fourth common axis.

19. The MEMS sensor of claim 15, wherein the first compliant spring and the second compliant spring are each located at 20%-80% of the length of a respective anchor side from a first corner of the first anchor, the third compliant spring and the fourth compliant spring are each located at 20%-80% of the length of a respective anchor side from a second corner of the second anchor, the fifth compliant spring and the sixth compliant spring are each located at 20%-80% of the length of a respective anchor side from a third corner of the third anchor, and wherein the seventh compliant spring and the eighth compliant spring are each located at 20%-80% of the length of a respective anchor side from a fourth corner of the fourth anchor.

20. A microelectromechanical system (MEMS) sensor, comprising:
at least one anchor that extends into a MEMS layer;
a suspended spring-mass system located in the MEMS layer comprising a proof mass, wherein the proof mass comprises an upper plane and a lower plane parallel to the upper plane, and wherein each of the upper plane and the lower plane extend along a respective first direction and a respective second direction in an initial orientation when at rest, and the at least one anchor displaceable from an initial position when at rest to a tilted position in response to a shear force applied to the MEMS sensor in a plane defined by the first and second directions;
a first compliant spring connected between the at least one anchor and the proof mass, wherein the first compliant spring is configured to rotate about an axis extending in the first direction in response to a first component of the shear force along the second direction and maintain the proof mass in the initial orientation when the first component of the shear force is applied to the MEMS sensor;
a second compliant spring connected between the at least one anchor and the proof mass, wherein the second compliant spring is configured to rotate about an axis extending in the second direction in response to a second component of the shear force along the first direction and maintain the proof mass in the initial orientation when the second component of the shear force is applied to the MEMS sensor, and wherein the first compliant spring and the second compliant spring are each located at 20%-80% of the length of a respective anchor side from a first corner of the at least one anchor, and
a first stiffening spring extending along the first direction parallel to the first axis; and
a second stiffening spring extending along the second direction parallel to the second axis, wherein
the first stiffening spring and the second stiffening spring connect the proof mass to the coupling mass.

* * * * *